United States Patent
Kuang

(10) Patent No.: US 10,487,004 B2
(45) Date of Patent: *Nov. 26, 2019

(54) OPTICAL GLASS AND OPTICAL ELEMENT

(71) Applicant: CDGM GLASS CO., LTD., Chengdu, Sichuan (CN)

(72) Inventor: Bo Kuang, Sichuan (CN)

(73) Assignee: CDGM Glass Co., Ltd., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/080,893

(22) PCT Filed: Nov. 22, 2016

(86) PCT No.: PCT/CN2016/106787
§ 371 (c)(1),
(2) Date: Aug. 29, 2018

(87) PCT Pub. No.: WO2017/152657
PCT Pub. Date: Sep. 14, 2017

(65) Prior Publication Data
US 2019/0031556 A1    Jan. 31, 2019

(30) Foreign Application Priority Data
Mar. 7, 2016 (CN) .......................... 2016 1 0127351

(51) Int. Cl.
*C03C 3/155* (2006.01)
*C03C 3/068* (2006.01)
(52) U.S. Cl.
CPC ............... *C03C 3/155* (2013.01); *C03C 3/068* (2013.01)
(58) Field of Classification Search
CPC ......... C03C 3/064; C03C 3/066; C03C 3/068; C03C 3/155
See application file for complete search history.

(56) References Cited

U.S. PATENT DOCUMENTS

| | | | | |
|---|---|---|---|---|
| 2005/0049135 A1* | 3/2005 | Hayashi | ................ | C03C 3/068 501/78 |
| 2006/0079389 A1* | 4/2006 | Hayashi | ................ | C03C 3/068 501/50 |
| 2013/0190162 A1* | 7/2013 | Sun | ................ | C03C 3/068 501/78 |
| 2019/0062199 A1* | 2/2019 | Kuang | ................ | C03C 3/068 |

FOREIGN PATENT DOCUMENTS

| | | |
|---|---|---|
| CN | 1590329 A | 3/2005 |
| CN | 101029938 A | 9/2005 |
| CN | 105645765 A | 6/2016 |
| JP | 2005298262 A | 10/2005 |

OTHER PUBLICATIONS

International Search Report for PCT/CN2016/106787 dated Feb. 27, 2017.

* cited by examiner

*Primary Examiner* — Elizabeth A. Bolden
(74) *Attorney, Agent, or Firm* — Caesar Rivise, PC

(57) ABSTRACT

The invention provides a high-refraction low-dispersion optical glass with refractive index of 1.76-1.80 and Abbe number of 47-51. The glass has an excellent transmittance when the content of $Ta_2O_5$ in glass component is reduced. The optical glass comprises the following components by molar percentage: 40-65% of $B_2O_3$; 6-21% of $La_2O_3$; 1-15% of $Gd_2O_3$; greater than 6.5% but less than or equal to 15% of $ZrO_2$; ad 10-28% of ZnO. According to the present invention, the transmittance of glass becomes excellent without introducing $SnO_2$; the product cost is optimized by reducing the content of $Ta_2O_5$; with reasonable component ratio, the high-refraction low-dispersion optical glass in favor of precision molding and with excellent transmittance, as well as the glass preform and optical element made of the optical glass can be easily enabled while the required optical constant of the glass is realized.

13 Claims, No Drawings

OPTICAL GLASS AND OPTICAL ELEMENT

CROSS REFERENCE TO RELATED APPLICATIONS

This United States national phase application claims benefit under 35 U.S.C. § 371 of PCT Application No. PCT/CN2016/106787 filed on Nov. 22, 2016, which in turn claims benefit under Chinese Application Serial No. 201610127351.8 filed on Mar. 7, 2016 and all of whose entire disclosures are incorporated by reference herein

TECHNICAL FIELD

The invention relates to an optical glass with high-refraction low-dispersion, and a glass preform and an optical element made of the above optical glass.

BACKGROUND OF THE INVENTION

For optical glass, refractive index, Abbe number and transmittance are its core optic characters. The refractive index and Abbe number decide the basic functions of glass, and the optical glass with the refractive index of 1.76-1.80 and Abbe number of 47-51 is a high-refraction low-dispersion optical glass. The application of such high performance glass in an optical system can shorten the length of lens and improve the imaging quality.

In order to meet the requirements for precision molding of optical glass, the transition temperature Tg of optical glass is required. Under the premise of realizing the same optical performance, how to realize low Tg temperature of glass and guarantee excellent transmittance is the objective of research and development at present. CN102050571A discloses a high refractive index optical glass with a refractive index of 1.77-1.83 and Abbe number of 44-51, but its Tg temperature is higher, so it is not suitable for low-cost precision molding. In addition, the glass contains a lot of $Ta_2O_5$, while $Ta_2O_5$ belongs to an expensive metal oxide, and intensive use may increase the material cost of the high-refraction low-dispersion optical glass and reduce the product economy. Additionally, it further contains $SnO_2$, which is not only difficult to melt, easy to form impurities in glass, and affect the inherent quality and processing performance of glass, but also can improve the pigmentation degree of glass, reduce the transmittance. The optical element of the optical system for camera shooting or projecting has higher requirements for the transmittance of optical glass, and the transmission light of the optical system will be affected if the transmission light of the lens formed by high-refraction low-dispersion optical glass is not enough, thus influencing the imaging quality.

BRIEF SUMMARY OF THE INVENTION

The technical problem to be solved by the present invention is to provide a high-refraction low-dispersion optical glass with refractive index of 1.76-1.80 and Abbe number of 47-51. The glass has an excellent transmittance when the content of $Ta_2O_5$ in glass component is reduced.

The present invention also provides a glass preform and an optical element made of the above optical glass.

To solve the technical problem, the present invention provides the optical glass, comprising the following components by molar percentage: 40-65% of $B_2O_3$, 6-21% of $La_2O_3$, 1-15% of $Gd_2O_3$, greater than 6.5% but less than or equal to 15% of $ZrO_2$; 10-28% of ZnO.

Further, it further comprises the following components by molar percentage: 0-8% of $Ta_2O_5$; 0-8% of $Nb_2O_5$; 0-2% of $SiO_2$; 0-8% of $Y_2O_3$; 0-10% of $GeO_2$; 0-10% of $Bi_2O_3$; 0-10% of $Al_2O_3$; 0-3% of $Li_2O$; 0-10% of $Na_2O+K_2O$; 0-1% of $CeO_2$; 0-1% of $Sb_2O_3$; 0-10% of RO, wherein, RO is one or more of MgO, CaO, SrO or BaO.

Further, it comprises 0-3% of $Ta_2O_5$ and/or 0-3% of $Nb_2O_5$ and/or 0-1% of $SiO_2$ and/or 0-3% of $Y_2O_3$ and/or 0-5% of $GeO_2$ and/or 0-5% of $Bi_2O_3$ and/or 0-5% of $Al_2O_3$ and/or less than 1% of $Li_2O$ and/or 0-5% of $Na_2O+K_2O$ and/or 0-0.5% of $CeO_2$ and/or 0-0.5% of $Sb_2O_3$ and/or 0-5% RO.

Further, $(Ta_2O_5+Nb_2O_5)/(ZnO+Li_2O)$ is less than 0.35.
Further, $La_2O_3/(La_2O_3+Gd_2O_3+Y_2O_3)$ is 0.20-0.80.
Further, $ZrO_2/(B_2O_3+SiO_2)$ is 0.10-0.35.
Further, $(Ta_2O_5+Nb_2O_5)/(ZnO+Li_2O)$ is less than 0.10.
Further, $La_2O_3/(La_2O_3+Gd_2O_3+Y_2O_3)$ is 0.40-0.70.
Further, $ZrO_2/(B_2O_3+SiO_2)$ is 0.10-0.20.
Further, it comprises 45-61% of $B_2O_3$ and/or 6-18% of $La_2O_3$ and/or 1-10% of $Gd_2O_3$ and/or greater than 6.5% but less than or equal to 10% of $ZrO_2$ and/or 12-25% of ZnO.

Further, the refractive index of the glass is 1.76-1.80; the Abbe number is 47-51; $\lambda_{80}/\lambda_5$ is below 385/285; the density is below 5.00 g/cm$^3$; the transition temperature Tg is below 625° C.

A glass preform is made of the above optical glass.
An optical element is made of the above optical glass.

According to the present invention, the transmittance of glass becomes excellent without introducing $SnO_2$; the product cost is optimized by reducing the content of $Ta_2O_5$; with reasonable component ratio, the high-refraction low-dispersion optical glass in favor of precision molding and with excellent transmittance, as well as the glass preform and optical element made of the optical glass can be easily enabled while the required optical constant of the glass is realized.

DETAILED DESCRIPTION OF THE INVENTION

I. Optical Glass

The component of the optical glass in the present invention will be described in detail below, the content and total content of each glass component are expressed by mol % unless otherwise specified, and the ratio of the content to the total content of glass component is expressed by molar ratio. In addition, in the following description, if referred to below or above the prescribed value, the prescribed value is included.

$B_2O_3$ is a glass network forming component having effects of improving glass meltability and reducing glass transition temperature. In order to achieve the above-mentioned effect, 40% or more of $B_2O_3$ is introduced in the present invention. However, when the introduced amount exceeds 65%, the glass stability will be lowered, so will the refractive index, such that the high refractive index of the present invention cannot be obtained. Therefore, the content of $B_2O_3$ in the present invention is 40-65%, preferably 45-61%, and more preferably 48-60%.

$SiO_2$ is also a glass forming body, which is different from the loose chain layered network formed by $B_2O_3$. $SiO_2$ forms silica-oxygen tetrahedron three-dimensional network in the glass, being very dense and solid. This network is added into the glass to reinforce the loose boron oxide triangular body [$BO_3$] network to make it dense, thereby enhancing the high temperature viscosity of the glass. At the same time, the addition of the silica-oxygen tetrahedron three-dimensional network and the improved capability of glass network isolating devitrification cations and anions such as $La_2O_3$, $Nb_2O_5$ increase the devitrification threshold, so that the anti-devitrification property of the glass is improved. However, if the content of $SiO_2$ is increased without limitation, difficulties in dissolution will arise. On the other hand, the content of rare earth oxides including $La_2O_3$ and $Gd_2O_3$ will be increased inevitably to maintain a higher refractive index and low dispersion, while the solubility of $SiO_2$ to $La_2O_3$ is relatively low, thus resulting in sharp drop of anti-devitrification property of glass. Therefore, in the present invention, its content is confined to 0-2%, preferably 0-1%.

$La_2O_3$ is an essential component for obtaining the optical properties required for the present invention. When the content of $La_2O_3$ is less than 6%, it is difficult to achieve the required optical properties; but when the content exceeds 21%, the devitrification resistance and melting property of glass will deteriorate. Therefore, the content of $La_2O_3$ in the present invention is 6-21%, preferably 6-18%, and more preferably 8-16%.

$Gd_2O_3$ is an effective component for obtaining the high-refraction optical glass. The stability of glass can be improved through the coexistence of $Gd_2O_3$ and $La_2O_3$ in the present invention, but the above effect will not be obvious when the content of $Gd_2O_3$ is lower than 1%; when its content exceeds 15%, the devitrification resistance of glass will reduce, and the stability of the glass formed will then be worsened. Therefore, the content of $Gd_2O_3$ in the present invention is 1-15%, preferably 1-10%, and more preferably 2-9%.

$Y_2O_3$ is also preferably introduced into the high-refraction low-dispersion components of the present invention, which can improve the meltability and devitrification resistance of glass and reduce the upper limit of devitrification temperature of glass. However, if its content exceeds 8%, the stability and devitrification resistance of glass will decrease. Therefore, the content of $Y_2O_3$ is 0-8%, preferably 0-3%.

In $La_2O_3$, $Gd_2O_3$ and $Y_2O_3$, the component with the greatest impact on improving glass refractive index and maintaining glass stability is $La_2O_3$. However, if only $La_2O_3$ is used in the optical glass of the present invention, it is difficult to ensure the sufficient glass stability. Therefore, the introduced amount of $La_2O_3$ in the present invention is relatively great, and $La_2O_3$ is made coexist with $Gd_2O_3$; or preferably $La_2O_3$ and $Gd_2O_3$ are made to coexist with $Y_2O_3$; the more preferable ratio of $La_2O_3/(La_2O_3+Gd_2O_3+Y_2O_3)$ is 0.20-0.80, further preferably 0.35-0.70, and furthermore preferably $La_2O_3/(La_2O_3+Gd_2O_3+Y_2O_3)$ is 0.40-0.70, then, the high-refraction low-dispersion glass with excellent stability can be obtained, while the glass is not easy to be colored.

$Nb_2O_5$ has an effect of improving glass refractive index and lowering liquidus temperature, as well as improving the anti-devitrification property and chemical durability of glass. If its content exceeds 8%, the dispersion of glass will be improved, and the optical property of the glass in the present invention cannot be obtained. Therefore, the content of $Nb_2O_5$ is 0-8%, preferably 0-3%, more preferably 0-0.5%.

$Ta_2O_5$ can increase the refractive index and does better than $Nb_2O_5$ in maintaining the low dispersion of glass. However, $Ta_2O_5$ is very expensive when compared with other components, hence, its usage is reduced in the present invention from the perspectives of utility and cost. The content of $Ta_2O_5$ in the present invention is 0-8%, preferably 0-3%, more preferably 0-0.5%, and further preferably not introduced.

The appropriate addition of ZnO in glass can improve the chemical stability and reduce the high-temperature viscosity and temperature Tg of glass. However, if ZnO is added too much, the anti-devitrification property of glass will decline, while the high temperature viscosity is small, bringing challenge to molding. In this glass system, the temperature Tg cannot meet the design requirements, if the content of ZnO is less than 10%. If the content is higher than 28%, the anti-devitrification property of glass will decrease and the high-temperature viscosity cannot meet the design requirements. Therefore, the content of ZnO is confined to 10-28%, preferably 12-25%.

$ZrO_2$ belongs to high-refraction oxide, which can significantly improve the refractive index and chemical stability of glass. In the present invention, $ZrO_2$ also plays a role in improving the abnormal dispersion of glass which is favorable to eliminate secondary spectrum in optical design. The aforesaid effect will not be significant if its content is excessively low, while the risks of glass devitrification will be remarkably increased if the content is excessive. Therefore, its content is confined to be greater than 6.5% but less than or equal to 15%, preferably greater than 6.5% but less than or equal to 10%.

In order to obtain an easy-melting glass with good chemical stability in the present invention, the inventor, through a large number of experimental studies, has found that the chemical stability and melting temperature of glass can reach the best balance to obtain a product with better quality when the range of $ZrO_2/(B_2O_3+SiO_2)$ is 0.10-0.35, preferably 0.10-0.30 and further preferably 0.10-0.20.

The introduction of a small amount of $Al_2O_3$ can improve the stability and chemical stability of glass. However, when the content exceeds 10%, a tendency of meltability deterioration and devitrification resistance reduction of glass is shown. Therefore, the content of $Al_2O_3$ in the present invention is 0-10%, preferably 0-5%, more preferably 0-1%, and further preferably not introduced.

The addition of $Li_2O$ into glass component can effectively lower the temperature Tg. But the optical glass with low softening point is usually smelted with platinum or platinum alloy vessels. During high temperature smelting, $Li^+$ in the glass component easily corrodes platinum or platinum alloy vessels, resulting in more platinum-containing foreign matters in the finished glass, leading to a decline in the quality of the glass. On the other hand, when such glass is used for precision molding, the glass element is easy to have a fuzzy surface, because the die is generally coated with carbon-bearing releasing agent, Li in the glass component is easy to have a reaction with carbon in the releasing agent, thereby generating a rough opaque film on the surface of the glass element. Therefore, in the present invention, the content of $Li_2O$ is confined to 0-3%, preferably less than 1%, and more preferably 0-0.5%.

$Na_2O$ and $K_2O$ are optional components which are effective in lowering Tg, and if the content thereof is excessive, it is easy to cause increased devitrification temperature and vitrification difficulties, thus, the total amount of $Na_2O$ and $K_2O$ is confined to 0-10%, more preferably 0-5%, and further preferably 0-1%.

Based on a large number of experimental studies, the inventor has found that the ratio of the total content of $Ta_2O_5+Nb_2O_5$ to the total content of $ZnO+Li_2O$ has a greater impact on the chemical stability and temperature Tg of the glass. When $(Ta_2O_5+Nb_2O_5)/(ZnO+Li_2O)$ exceeds 0.35, the temperature Tg will increase significantly, unfavorable for precision molding; when $(Ta_2O_5+Nb_2O_5)/(ZnO+Li_2O)$ is less than 0.10, the chemical stability of the glass will be greatly enhanced and the glass density will be effectively decreased. In this regard, for the glass provided by the present invention, the ratio of $(Ta_2O_5+Nb_2O_5)/(ZnO+Li_2O)$ is confined to be less than 0.35, preferably less than 0.10, and more preferably less than 0.07.

RO (one or more of MgO, CaO, SrO or BaO) can improve meltability and adjust the optical property of glass. However, when the content of RO is more than 10%, the devitrification resistance of glass will be reduced. Therefore, the content of RO provided by the present invention is 0-10%, more preferably 0-5%, and further preferably 0-1%.

$Bi_2O_3$ can increase the refractive index of glass, but its excessive content will lower the transmittance on the long side of short waves in the visible region and show a tendency of coloring. Therefore, the content of $Bi_2O_3$ provided by the present invention is preferably 0-10%, more preferably 0-5%, further preferably 0-1%, and furthermore preferably not introduced.

$GeO_2$ can effectively improve the stability and devitrification resistance of glass as well. As $GeO_2$ is very expensive, the content of $GeO_2$ is preferably 0-10%, more preferably 0-5%, further preferably 0-1%, and furthermore preferably not introduced.

The clarification effect of glass can be increased by adding a small amount of $Sb_2O_3$ and $CeO_2$. However, when the content of $Sb_2O_3$ is more than 1%, the glass will be faced with the risks of lowered devitrification resistance and increased dispersion. Meanwhile, deterioration of molding die will be promoted by its strong oxidation. Therefore, the addition of $Sb_2O_3$ is preferably 0-1%, more preferably 0-0.5%, and further preferably not added. The role and addition of $CeO_2$ are consistent with that of $Sb_2O$, so the content thereof is preferably 0-1%, more preferably 0-0.5%, and further preferably not added.

F is an ingredient having great effects of improving light refraction and lowering temperature coefficient of a relative refractive index. However, it is served as the optical element difficultly on account that an environmental load problem is caused by volatilization in its production process and a heterogeneous part is formed for its volatilization from a glass surface in a forming temperature area. Furthermore, the ingredient F is not introduced to realize excellent quality of the glass and good optical constant consistency in the present invention.

Hereinafter, the properties of the optical glass provided by the present invention will be described.

[Optical Constant of Optical Glass]

The optical glass provided by the present invention is a high-refraction low-dispersion glass. A lens made of the high-refraction low-dispersion glass is mostly combined with a lens made of high-refraction high-dispersion glass for chromatic aberration correction. The optical glass provided by the present invention has a glass refractive index nd in the range of 1.76-1.80, preferably in the range of 1.76-1.79, more preferably in the range of 1.76-1.78, and further preferably in the range of 1.77-1.78, from the viewpoint of imparting optical properties suitable for its use. The range of the Abbe number $v_d$ of the glass provided by the present invention is in the range of 47-51, preferably in the range of 48-50 and more preferably in the range of 49-50.

[Coloring of Optical Glass]

The short-wave transmission spectrum characteristics of the glass provided by the present invention are represented by pigmentation degree ($\lambda_{80}/\lambda_5$. $\lambda_{80}$ refers to a wavelength corresponding to a glass transmittance of 80%, and $\lambda_5$ is a wavelength corresponding to a glass transmittance of 5%. The measurement of $\lambda_{go}$ is carried out using a glass having a thickness of 10±0.1 mm with two opposing planes parallel to each other and optically polished to measure the spectral transmittance in the wavelength region from 280 nm to 700 nm and a wavelength exhibiting 80% of the transmittance. The spectral transmittance or transmittance is indicated by $I_{out}/I_{in}$ in the case where the light of an intensity $I_{in}$ is incident perpendicularly to the above surface of the glass, passes through the glass and emits the light of an intensity $I_{out}$ from a plane, and includes the transmittance of the surface reflection lost on the above surface of the glass. The higher the refractive index of the glass is, the greater the surface reflection loss becomes. Thus, a small value of $\lambda_{80}$ means that the glass is colored very little in the high refractive index glass.

For the optical glass of the present invention, $\lambda_{80}$ is less than or equal to 400 nm, preferably less than or equal to 395 nm, more preferably less than or equal to 390 nm, further preferably less than or equal to 385 nm, and furthermore preferably less than or equal to 380 nm. $\lambda_5$ is less than or equal to 300 nm, preferably less than or equal to 290 nm, more preferably less than or equal to 285 nm, and further preferably less than or equal to 280 nm.

[Density of Optical Glass]

The density of optical glass is the mass per unit volume at a temperature of 20° C., expressed in $g/cm^3$.

The density of the glass provided by the present invention is below 5.00 $g/cm^3$, preferably below 4.80 $g/cm^3$, more preferably below 4.70 $g/cm^3$, and further preferably below 4.60 $g/cm^3$.

[Transition Temperature of Optical Glass]

The optical glass will gradually turn from a solid state to a plastic state within a certain temperature range. The transition temperature refers to the temperature at which the glass sample is heated from room temperature to sag temperature, corresponding to an intersection between extending lines of linear parts of a low temperature region and a high temperature region.

The transition temperature Tg of the glass provided by the present invention is below 625° C., preferably below 620° C., more preferably below 615° C., and further preferably below 610° C.

II. Optical Preform and Optical Element

Hereinafter, the optical preform and the optical element of the present invention will be described.

The optical preform and the optical element provided by the present invention are both made of the optical glass provided by the present invention described above. The optical preform provided by the present invention has a high refractive index and a low dispersion. The optical element provided by the present invention has a high refractive index and a low dispersion, which can provide such optical elements as various lenses and prisms having a high optical value at a low cost.

Examples of the lens include various lenses with spherical or aspheric surfaces, such as concave meniscus lens, convex meniscus lens, biconvex lens, biconcave lens, planoconvex lens and planoconcave lens.

This lens and a lens made of high-refraction high-dispersion glass are combined to correct the chromatic aberration, suitable as a lens for chromatic aberration correction. In addition, the lens is also effective for compactness of an optical system.

In addition, for the prism, due to the high refractive index, a compact wide-angle optical system can be realized by combining in the optical system, going through a curved optical path, and facing the desired direction.

[Optical Glass Embodiment]

The present invention is illustrated by the following embodiments, but shall not be limited to them.

The method of melting and molding the optical glass can be carried out by using the technology known to those skilled in the art. Glass raw materials (carbonate, nitrate, sulfate, hydroxide, oxide, boric acid, etc.) are weighed in the proportions of glass oxides and mixed uniformly, and then put into a smelting device (such as a platinum crucible), cooled to below 1,300° C. after appropriate mixing, clarification and homogenization at 1,150~1,400° C., poured or leaked in a molding die, and finally formed directly by such post-processing as annealing, processing, etc., or complete compression molding.

In addition, the characteristics of glass are measured by following methods, and the results are shown in Tables 1~4.

(1) Refractive Index nd and Abbe Number vd

The refractive index and Abbe number are tested as per the method specified in GB/T7962.1-2010.

(2) Pigmentation Degree of Glass ($\lambda_{80}$, $\lambda_{5}$)

The spectral transmittance is measured by using a glass sample having a thickness of 10±0.1 mm with two opposing planes optically polished, and calculated on the basis of the result.

(3) Transition Temperature of Glass (Tg)

Measurement is made as per the method specified in GB/T7962.16-2010.

(4) Proportion (ρ)

Measurement is made as per the method specified in GB/T7962.20-2010.

TABLE 1

| Composition | Embodiment | | | | | | | | | |
|---|---|---|---|---|---|---|---|---|---|---|
| | 1 | 2 | 3 | 4 | 5 | 6 | 7 | 8 | 9 | 10 |
| $SiO_2$ | 1.82 | 1.24 | 0.85 | 0.52 | 0.66 | 0.51 | 0 | 0.68 | 1.35 | 1.08 |
| $B_2O_3$ | 41.33 | 45.21 | 64.51 | 60.54 | 51.2 | 48.14 | 51.02 | 50.64 | 60.41 | 58.32 |
| $La_2O_3$ | 20.84 | 6.74 | 7.15 | 7.65 | 17.36 | 13.05 | 11.33 | 10.36 | 8.15 | 16.24 |
| $Gd_2O_3$ | 1.37 | 14.21 | 5.97 | 6.34 | 9.51 | 5.67 | 7.05 | 8.15 | 3.54 | 4.25 |
| $ZrO_2$ | 14.68 | 6.75 | 7.25 | 9.22 | 8.14 | 6.92 | 7.24 | 9.22 | 8.11 | 7.25 |
| ZnO | 11.22 | 24.17 | 12.06 | 13.53 | 12.7 | 16.33 | 17.05 | 18.70 | 14.59 | 11.78 |
| $Ta_2O_5$ | 1.27 | 0 | 0 | 0.63 | 0 | 2.17 | 0.26 | 0 | 0.46 | 0 |
| $Nb_2O_5$ | 0.56 | 0 | 0 | 0 | 0.43 | 0 | 1.28 | 0 | 0.37 | 0.22 |
| $Y_2O_3$ | 6.33 | 0.43 | 0 | 0 | 0 | 1.54 | 0 | 0.26 | 2.20 | 0 |
| $Bi_2O_3$ | 0 | 0 | 0.34 | 0 | 0 | 2.14 | 0 | 0 | 0 | 0.17 |
| $GeO_2$ | 0 | 0 | 0 | 0 | 0 | 0 | 1.20 | 0 | 0 | 0 |
| $Al_2O_3$ | 0 | 0 | 1.22 | 0 | 0 | 1 | 0 | 1.34 | 0 | 0 |
| $Li_2O$ | 0.34 | 0 | 0.65 | 1.57 | 0 | 0.63 | 0.95 | 0 | 0.74 | 0.69 |
| $Na_2O + K_2O$ | 0 | 1.25 | 0 | 0 | 0 | 0 | 0 | 0.65 | 0 | 0 |
| RO | 0 | 0 | 0 | 0 | 0 | 1.55 | 2.38 | 0 | 0 | 0 |
| $CeO_2$ | 0 | 0 | 0 | 0 | 0 | 0.35 | 0 | 0 | 0 | 0 |
| $Sb_2O_3$ | 0.24 | 0 | 0 | 0 | 0 | 0 | 0.24 | 0 | 0.08 | 0 |
| Total | 100 | 100 | 100 | 100 | 100 | 100 | 100 | 100 | 100 | 100 |
| $La_2O_3/(La_2O_3 + Gd_2O_3 + Y_2O_3)$ | 0.7302 | 0.3152 | 0.545 | 0.5468 | 0.6461 | 0.6441 | 0.6164 | 0.5519 | 0.5868 | 0.7926 |
| $(Ta_2O_5 + Nb_2O_5)/(ZnO + Li_2O)$ | 0.1583 | 0 | 0 | 0.0417 | 0.0339 | 0.1279 | 0.0856 | 0 | 0.0541 | 0.0176 |
| $ZrO_2/(B_2O_3 + SiO_2)$ | 0.3402 | 0.1453 | 0.1109 | 0.1510 | 0.1570 | 0.1422 | 0.1419 | 0.1797 | 0.1313 | 0.1221 |
| nd | 1.79231 | 1.78214 | 1.76345 | 1.77214 | 1.77485 | 1.78234 | 1.78452 | 1.77524 | 1.77685 | 1.77258 |
| vd | 48.32 | 48.25 | 47.62 | 49.33 | 49.25 | 49.71 | 49.50 | 49.62 | 48.25 | 50.14 |
| ρ (g/cm³) | 4.725 | 4.851 | 4.625 | 4.468 | 4.523 | 4.531 | 4.512 | 4.459 | 4.560 | 4.527 |
| $\lambda 80/\lambda 5$ | 382/284 | 387/282 | 380/281 | 382/284 | 379/280 | 378/280 | 381/280 | 382/285 | 382/279 | 378/278 |
| Tg (° C.) | 618.4 | 609.8 | 615.3 | 614.7 | 616.2 | 617.2 | 615.4 | 615.7 | 616.0 | 614.8 |

TABLE 2

| Composition | Embodiment | | | | | | | | | |
|---|---|---|---|---|---|---|---|---|---|---|
| | 11 | 12 | 13 | 14 | 15 | 16 | 17 | 18 | 19 | 20 |
| $SiO_2$ | 0.56 | 0.26 | 1.34 | 0.87 | 0.74 | 0.33 | 0.52 | 1.54 | 1.23 | 0.6 |
| $B_2O_3$ | 43.5 | 52.64 | 51.22 | 55.34 | 51.27 | 52.34 | 53.17 | 48.15 | 49.37 | 51.57 |
| $La_2O_3$ | 16.33 | 10.78 | 11.47 | 8.82 | 12.3 | 13.25 | 7.54 | 15.25 | 14.25 | 10.8 |
| $Gd_2O_3$ | 7.14 | 6.84 | 7.08 | 5.36 | 8.22 | 4.57 | 9.2 | 10.2 | 12.4 | 7.3 |
| $ZrO_2$ | 10.23 | 8.64 | 7.69 | 9.05 | 7.64 | 11.05 | 13.07 | 8.14 | 7.36 | 8.84 |
| ZnO | 15.36 | 18.33 | 19.14 | 20.01 | 16.34 | 17.79 | 15.73 | 16.14 | 13.7 | 19.54 |
| $Ta_2O_5$ | 0.67 | 0.14 | 0 | 0 | 0 | 0 | 0 | 0 | 0 | 0 |
| $Nb_2O_5$ | 1.20 | 0 | 0 | 0 | 0.25 | 0 | 0 | 0 | 0.47 | 0 |
| $Y_2O_3$ | 0.75 | 1.25 | 0 | 0 | 0 | 0 | 0.34 | 0 | 0 | 0.36 |
| $Bi_2O_3$ | 0 | 0 | 0 | 0 | 1.13 | 0 | 0 | 0 | 0 | 0 |
| $GeO_2$ | 0.63 | 0 | 0 | 0 | 0 | 0 | 0 | 0 | 0 | 0 |
| $Al_2O_3$ | 1.54 | 0 | 0.50 | 0 | 0 | 0 | 0 | 0 | 0 | 0 |
| $Li_2O$ | 0.66 | 0.78 | 1.24 | 0.55 | 0.67 | 0 | 0.36 | 0.58 | 0 | 0.74 |
| $Na_2O + K_2O$ | 0 | 0.34 | 0 | 0 | 0 | 0.67 | 0 | 0 | 1.22 | 0 |

TABLE 2-continued

| | Embodiment | | | | | | | | | |
|---|---|---|---|---|---|---|---|---|---|---|
| Composition | 11 | 12 | 13 | 14 | 15 | 16 | 17 | 18 | 19 | 20 |
| RO | 1.28 | 0 | 0 | 0 | 1.24 | 0 | 0 | 0 | 0 | 0 |
| $CeO_2$ | 0 | 0 | 0 | 0 | 0 | 0 | 0.07 | 0 | 0 | 0 |
| $Sb_2O_3$ | 0.15 | 0 | 0.32 | 0 | 0.20 | 0 | 0 | 0 | 0 | 0.25 |
| Total | 100 | 100 | 100 | 100 | 100 | 100 | 100 | 100 | 100 | 100 |
| $La_2O_3/(La_2O_3 + Gd_2O_3 + Y_2O_3)$ | 0.67424 | 0.5713 | 0.6183 | 0.622 | 0.5994 | 0.7435 | 0.4415 | 0.5992 | 0.5347 | 0.585 |
| $(Ta_2O_5 + Nb_2O_5)/(ZnO + Li_2O)$ | 0.1167 | 0.0073 | 0 | 0 | 0.0147 | 0 | 0 | 0 | 0.0343 | 0 |
| $ZrO_2/(B_2O_3 + SiO_2)$ | 0.2322 | 0.1633 | 0.1463 | 0.161 | 0.1469 | 0.2098 | 0.2434 | 0.1638 | 0.1455 | 0.1694 |
| nd | 1.77581 | 1.77468 | 1.78025 | 1.77457 | 1.77954 | 1.78026 | 1.76921 | 1.77485 | 1.77460 | 1.77400 |
| vd | 49.64 | 49.85 | 49.51 | 49.63 | 49.52 | 49.74 | 48.34 | 49.62 | 47.85 | 49.33 |
| ρ (g/cm³) | 4.521 | 4.536 | 4.502 | 4.571 | 4.520 | 4.615 | 4.492 | 4.471 | 4.580 | 4.486 |
| λ80/λ5 | 382/281 | 383/281 | 379/280 | 384/282 | 380/280 | 380/281 | 383/279 | 380/280 | 382/282 | 384/280 |
| Tg (° C.) | 616.2 | 614.1 | 613.8 | 608.5 | 615.4 | 614.8 | 614.2 | 614.0 | 615.5 | 613.9 |

TABLE 3

| | Embodiment | | | | | | | | | |
|---|---|---|---|---|---|---|---|---|---|---|
| Composition | 21 | 22 | 23 | 24 | 25 | 26 | 27 | 28 | 29 | 30 |
| $SiO_2$ | 0.68 | 0.74 | 0.52 | 0.85 | 0.62 | 0.91 | 0.45 | 1.34 | 0.82 | 0.76 |
| $B_2O_3$ | 52.16 | 51.67 | 51.63 | 50.64 | 51.31 | 53.24 | 52.16 | 49.7 | 54.67 | 48.71 |
| $La_2O_3$ | 10.78 | 12.34 | 11.25 | 13.36 | 10.34 | 9.37 | 14.2 | 12.07 | 11.74 | 8.36 |
| $Gd_2O_3$ | 8.34 | 7.39 | 6.85 | 7.05 | 6.82 | 9.33 | 5.61 | 6.58 | 9.24 | 3.93 |
| $ZrO_2$ | 8.67 | 9.26 | 8.33 | 7.95 | 8.24 | 7.81 | 7.34 | 7.89 | 10.27 | 12.37 |
| ZnO | 18.73 | 18.6 | 18.89 | 17.62 | 16.58 | 17.22 | 19.72 | 20.16 | 12.59 | 25.40 |
| $Ta_2O_5$ | 0 | 0 | 0 | 0 | 0.21 | 2.00 | 0 | 0 | 0 | 0 |
| $Nb_2O_5$ | 0.36 | 0 | 0 | 0 | 5.36 | 0 | 0 | 0 | 0 | 0 |
| $Y_2O_3$ | 0 | 0 | 0.15 | 0 | 0 | 0 | 0.25 | 0.64 | 0 | 0 |
| $Bi_2O_3$ | 0 | 0 | 0 | 0 | 0 | 0 | 0.07 | 0 | 0 | 0 |
| $GeO_2$ | 0 | 0 | 0 | 1.2 | 0 | 0 | 0 | 0 | 0 | 0 |
| $Al_2O_3$ | 0 | 0 | 0 | 0.67 | 0 | 0 | 0 | 0 | 0 | 0 |
| $Li_2O$ | 0.28 | 0 | 0.85 | 0.66 | 0.52 | 0.12 | 0 | 0 | 0.67 | 0.47 |
| $Na_2O + K_2O$ | 0 | 0 | 0 | 0 | 0 | 0 | 0 | 1.22 | 0 | 0 |
| RO | 0 | 0 | 1.33 | 0 | 0 | 0 | 0 | 0 | 0 | 0 |
| $CeO_2$ | 0 | 0 | 0 | 0 | 0 | 0 | 0 | 0.20 | 0 | 0 |
| $Sb_2O_3$ | 0 | 0 | 0.20 | 0 | 0 | 0 | 0 | 0.40 | 0 | 0 |
| Total | 100 | 100 | 100 | 100 | 100 | 100 | 100 | 100 | 100 | 100 |
| $La_2O_3/(La_2O_3 + Gd_2O_3 + Y_2O_3)$ | 0.5638 | 0.6254 | 0.6164 | 0.6546 | 0.6026 | 0.5011 | 0.7079 | 0.6257 | 0.5596 | 0.6802 |
| $(Ta_2O_5 + Nb_2O_5)/(ZnO + Li_2O)$ | 0.0189 | 0 | 0 | 0 | 0.3257 | 0.1153 | 0 | 0 | 0 | 0 |
| $ZrO_2/(B_2O_3 + SiO_2)$ | 0.1641 | 0.1767 | 0.1597 | 0.1544 | 0.1587 | 0.1442 | 0.1395 | 0.1546 | 0.1851 | 0.2501 |
| nd | 1.77524 | 1.77469 | 1.77635 | 1.77402 | 1.77485 | 1.77463 | 1.77392 | 1.77581 | 1.78034 | 1.77714 |
| vd | 48.95 | 49.26 | 49.51 | 49.62 | 49.37 | 49.50 | 49.29 | 49.48 | 49.55 | 49.52 |
| ρ (g/cm³) | 4.515 | 4.523 | 4.497 | 4.506 | 4.500 | 4.516 | 4.527 | 4.518 | 4.507 | 4.511 |
| λ80/λ5 | 382/280 | 379/276 | 381/282 | 380/280 | 381/282 | 384/281 | 379/280 | 380/278 | 380/280 | 381/281 |
| Tg (° C.) | 614.2 | 614.0 | 613.8 | 615.0 | 614.7 | 614.2 | 613.8 | 613.9 | 614.0 | 607.1 |

TABLE 4

| | Embodiment | | | | | | | | | |
|---|---|---|---|---|---|---|---|---|---|---|
| Composition | 31 | 32 | 33 | 34 | 35 | 36 | 37 | 38 | 39 | 40 |
| $SiO_2$ | 1.54 | 0.38 | 0.24 | 0.62 | 1.2 | 0.59 | 0.55 | 1.62 | 0.85 | 0.74 |
| $B_2O_3$ | 43.15 | 58.37 | 47.63 | 48.37 | 55.17 | 52.34 | 51.24 | 50.78 | 53.16 | 51.84 |
| $La_2O_3$ | 19.3 | 7.26 | 16.32 | 15.2 | 9.34 | 11.26 | 10.62 | 12.25 | 10.54 | 11.26 |
| $Gd_2O_3$ | 3.34 | 7.36 | 6.33 | 5.26 | 6.56 | 8.24 | 7.36 | 7.64 | 6.37 | 7.24 |
| $ZrO_2$ | 12.41 | 10.05 | 8.17 | 7.6 | 8.67 | 7.36 | 9.35 | 8.29 | 7.95 | 8.67 |
| ZnO | 15.25 | 16.01 | 17.72 | 22.48 | 17.81 | 18.99 | 19.67 | 18.77 | 19.58 | 19.53 |
| $Ta_2O_5$ | 3.00 | 0 | 0 | 0 | 0 | 0.33 | 0 | 0 | 0 | 0 |

TABLE 4-continued

| Composition | Embodiment | | | | | | | | | |
|---|---|---|---|---|---|---|---|---|---|---|
| | 31 | 32 | 33 | 34 | 35 | 36 | 37 | 38 | 39 | 40 |
| $Nb_2O_5$ | 0 | 0.20 | 0 | 0 | 0 | 0 | 0.52 | 0 | 0 | 0 |
| $Y_2O_3$ | 1.5 | 0 | 1.20 | 0 | 0 | 0 | 0 | 0 | 0 | 0 |
| $Bi_2O_3$ | 0 | 0 | 0 | 0 | 0 | 0 | 0 | 0 | 0 | 0 |
| $GeO_2$ | 0 | 0 | 0 | 0 | 0 | 0.74 | 0 | 0 | 0 | 0 |
| $Al_2O_3$ | 0 | 0 | 0.34 | 0 | 0 | 0 | 0 | 0 | 0 | 0 |
| $Li_2O$ | 0.51 | 0.31 | 0 | 0.47 | 1.25 | 0 | 0.47 | 0.65 | 0.81 | 0.62 |
| $Na_2O + K_2O$ | 0 | 0 | 0.65 | 0 | 0 | 0 | 0 | 0 | 0.74 | 0 |
| RO | 0 | 0 | 1.40 | 0 | 0 | 0 | 0 | 0 | 0 | 0 |
| $CeO_2$ | 0 | 0 | 0 | 0 | 0 | 0.15 | 0 | 0 | 0 | 0 |
| $Sb_2O_3$ | 0 | 0.06 | 0 | 0 | 0 | 0 | 0.22 | 0 | 0 | 0.1 |
| Total | 100 | 100 | 100 | 100 | 100 | 100 | 100 | 100 | 100 | 100 |
| $La_2O_3/(La_2O_3 + Gd_2O_3 + Y_2O_3)$ | 0.7995 | 0.4966 | 0.6843 | 0.7429 | 0.5874 | 0.5774 | 0.5907 | 0.6159 | 0.6233 | 0.6086 |
| $(Ta_2O_5 + Nb_2O_5)/(ZnO + Li_2O)$ | 0.1904 | 0.0123 | 0 | 0 | 0 | 0.0174 | 0.0258 | 0 | 0 | 0 |
| $ZrO_2/(B_2O_3 + SiO_2)$ | 0.2777 | 0.1711 | 0.1707 | 0.1551 | 0.1538 | 0.1391 | 0.1805 | 0.1582 | 0.1472 | 0.1649 |
| nd | 1.77452 | 1.77421 | 1.77435 | 1.77482 | 1.77462 | 1.77405 | 1.77428 | 1.77516 | 1.77490 | 1.77500 |
| vd | 49.51 | 49.25 | 49.37 | 49.52 | 49.50 | 49.61 | 49.60 | 49.58 | 49.51 | 49.53 |
| ρ (g/cm³) | 4.520 | 4.515 | 4.517 | 4.479 | 4.488 | 4.504 | 4.510 | 4.509 | 4.505 | 4.510 |
| λ80/λ5 | 379/280 | 381/280 | 383/285 | 377/279 | 380/280 | 380/280 | 381/280 | 378/277 | 380/281 | 382/280 |
| Tg (° C.) | 614.2 | 615.0 | 614.2 | 613.5 | 614.0 | 614.3 | 614.1 | 614.2 | 613.9 | 614.0 |

Optical Preform Embodiment

The optical glass obtained from Embodiment 3 in Table 23 is cut into the predetermined size, and a releasing agent is uniformly coated on the surface. Then, the glass is heated, softened and press-molded to produce the preforms of various lenses and prisms, including concave meniscus lens, convex meniscus lens, biconvex lens, biconcave lens, planoconvex lens and planoconcave lens.

Optical Element Embodiment

The preforms obtained in the above-mentioned optical preform embodiment are annealed for fine-tuning while the deformation inside the glass is reduced, so that the optical characteristics such as the refractive index are brought to the desired values.

Then, each preform is ground and polished to form a variety of lenses and prisms such as concave meniscus lens, convex meniscus lens, biconvex lens, biconcave lens, planoconvex lens and planoconcave lens. An anti-reflection film may be coated on the surface of the obtained optical element.

The present invention provides a high-refraction low-dispersion optical glass having a low cost and excellent transmittance, with refractive index of 1.76-1.80 and Abbe number of 47-51, and an optical element made of the glass, which can meet the demands of modern novel photoelectric products.

The invention claimed is:

1. An optical glass, comprising the following components by molar percentage: 40-65% of $B_2O_3$; 6-21% of $La_2O_3$; 1-15% of $Gd_2O_3$; greater than 6.5% but less than or equal to 15% of $ZrO_2$; and 10-21% of ZnO, wherein the refractive index of the glass is 1.76-1.80 and the Abbe number is 47-51.

2. The optical glass according to claim 1, further comprising 0-8% of $Ta_2O_5$; 0-8% of $Nb_2O_5$; 0-2% of $SiO_2$; 0-8 of $Y_2O_3$; 0-10% of $GeO_2$; 0-10% of $Bi_2O_3$; 0-10% of $Al_2O_3$; 0-3% of $Li_2O$; 0-10% of $Na_2O+K_2O$; 0-1% of $CeO_2$; 0-1% of $Sb_2O_3$; 0-10% of RO, wherein RO is one or more of MgO, CaO, SrO or BaO.

3. The optical glass according to claim 2, further comprising: 0-3% of $Ta_2O_5$ and/or 0-3% of $Nb_2O_5$; 0-1% of $SiO_2$ and/or 0-3% of $Y_2O_3$ and/or 0-5% of $GeO_2$ and/or 0-5% of $Bi_2O_3$ and/or 0-5% of $Al_2O_3$ and less than 1% of $Li_2O$ and/or 0-5% of $Na_2O+K_2O$ and/or 0-0.5% of $CeO_2$ and/or 0-0.5% of $Sb_2O_3$ and/or 0-5% of RO.

4. The optical glass according to claim 1, further comprising 45-61% of $B_2O_3$ and/or 6-18% of $La_2O_3$ and/or 1-10% of $Gd_2O_3$ and/or greater than 6.5% but less than or equal to 10% of $ZrO_2$ and/or 12-21% of ZnO.

5. The optical glass according to claim 1 wherein $(Ta_2O_5+Nb_2O_5)/(ZnO+Li_2O)$ is less than 0.35.

6. The optical glass according to claim 1, wherein $(Ta_2O_5+Nb_2O_5)/(ZnO+Li_2O)$ is less than 0.10.

7. The optical glass according to claim 1, wherein $La_2O_3/(La_2O_3+Gd_2O_3+Y_2O_3)$ is 0.20-0.80.

8. The optical glass according to claim 1, wherein $La_2O_3/(La_2O_3+Gd_2O_3+Y_2O_3)$ is 0.40-0.70.

9. The optical glass according to claim 1, wherein $ZrO_2/(B_2O_3+SiO_2)$ is 0.10-0.35.

10. The optical glass according to claim 1, wherein $ZrO_2/(B_2O_3+SiO_2)$ is 0.10-0.20.

11. The optical glass according to any of claim 1, wherein $\lambda_{80}/\lambda_5$ is below 385/285; the density is below 5.00 g/cm³; and the transition temperature Tg is below 625° C.

12. A glass preform, made of the optical glass according to claim 1.

13. An optical element, made of the optical glass according to claim 1.

* * * * *